(12) United States Patent
Kanaya

(10) Patent No.: US 8,824,030 B2
(45) Date of Patent: Sep. 2, 2014

(54) IMAGE READING WITH COLOR SHIFT CORRECTION

(75) Inventor: Shingo Kanaya, Ishikawa (JP)

(73) Assignee: PFU Limited, Ishikawa (JP)

( * ) Notice: Subject to any disclaimer, the term of this patent is extended or adjusted under 35 U.S.C. 154(b) by 102 days.

(21) Appl. No.: 13/444,567

(22) Filed: Apr. 11, 2012

(65) Prior Publication Data

US 2012/0320437 A1    Dec. 20, 2012

(30) Foreign Application Priority Data

Jun. 15, 2011   (JP) .................. 2011-133678

(51) Int. Cl.
  *G03F 3/08*   (2006.01)
  *H04N 1/401*  (2006.01)
  *H04N 1/195*  (2006.01)
  *H04N 1/60*   (2006.01)

(52) U.S. Cl.
  CPC ............ *H04N 1/401* (2013.01); *H04N 1/19594* (2013.01); *H04N 2201/0436* (2013.01); *H04N 1/6086* (2013.01)
  USPC ........................... 358/518; 358/3.23; 358/523

(58) Field of Classification Search
  USPC ......... 358/1.1, 1.9, 3.23, 3.26, 500, 501, 518, 358/523
  See application file for complete search history.

(56) References Cited

U.S. PATENT DOCUMENTS

| 5,218,200 | A    | 6/1993  | Morii et al.    |
| 5,515,181 | A    | 5/1996  | Iyoda et al.    |
| 5,625,183 | A *  | 4/1997  | Kashitani et al. ............. 250/236 |
| 5,760,925 | A    | 6/1998  | Saund et al.    |
| 5,764,383 | A    | 6/1998  | Saund et al.    |
| 5,818,612 | A    | 10/1998 | Segawa et al.   |
| 5,835,241 | A    | 11/1998 | Saund           |
| 5,969,829 | A    | 10/1999 | Matsuda et al.  |
| 5,978,102 | A    | 11/1999 | Matsuda         |
| 6,164,740 | A    | 12/2000 | Hirai et al.    |
| 6,316,767 | B1   | 11/2001 | Paxton et al.   |
| 6,325,288 | B1   | 12/2001 | Spitz           |
| 6,609,162 | B1   | 8/2003  | Shimizu et al.  |
| 6,738,166 | B1   | 5/2004  | Kano et al.     |
| 6,771,394 | B1   | 8/2004  | Nakanishi et al.|
| 6,963,428 | B1   | 11/2005 | Gann            |

(Continued)

FOREIGN PATENT DOCUMENTS

| CN | 1307714 A    | 8/2001 |
| CN | 101237509 A  | 8/2008 |
| JP | 63-107366 A  | 5/1988 |
| JP | 6-18424      | 3/1994 |

OTHER PUBLICATIONS

United States Office Action issued in U.S. Appl. No. 13/445,436 dated Sep. 11, 2013.

(Continued)

*Primary Examiner* — Thomas D Lee
(74) *Attorney, Agent, or Firm* — McDermott Will & Emery LLP

(57) ABSTRACT

An image-reading apparatus, includes a variation acquiring unit that acquires a variation of a distance or an angle between a medium to be read and an imaging unit or a light source, and a color shift correcting unit that calculates a color shift between the medium and the imaging unit or the light source based on the variation acquired by the variation acquiring unit and corrects the color shift.

5 Claims, 8 Drawing Sheets

(56) References Cited

U.S. PATENT DOCUMENTS

| | | |
|---|---|---|
| 6,965,460 B1 | 11/2005 | Gann et al. |
| 7,072,527 B1 | 7/2006 | Nako |
| 7,460,284 B2 * | 12/2008 | Hiromatsu ................... 358/518 |
| 7,612,162 B2 | 11/2009 | Okada et al. |
| 7,652,781 B2 | 1/2010 | Fukui et al. |
| 7,724,390 B2 | 5/2010 | Imai |
| 7,730,191 B2 | 6/2010 | Otsuka et al. |
| 7,731,662 B2 | 6/2010 | Anderson et al. |
| 7,916,331 B2 | 3/2011 | Shinozaki |
| 7,982,919 B2 | 7/2011 | Mishima et al. |
| 8,137,010 B2 | 3/2012 | Yoshida et al. |
| 8,159,731 B2 | 4/2012 | Sato et al. |
| 8,356,084 B2 | 1/2013 | Yamamoto |
| 8,503,045 B2 * | 8/2013 | Kubo et al. ................... 358/474 |
| 8,559,071 B2 * | 10/2013 | Kawata ......................... 358/474 |
| 2005/0175365 A1 | 8/2005 | Gomi |
| 2007/0041039 A1 | 2/2007 | Doui |
| 2008/0180761 A1 | 7/2008 | Sato et al. |
| 2010/0302607 A1 * | 12/2010 | Hock ............................. 358/474 |
| 2011/0299135 A1 | 12/2011 | Takabatake |
| 2011/0299136 A1 | 12/2011 | Kubo et al. |
| 2012/0314264 A1 * | 12/2012 | Kimura ......................... 358/474 |
| 2012/0320430 A1 * | 12/2012 | Murata et al. ................. 358/474 |
| 2012/0320434 A1 | 12/2012 | Takeda |
| 2012/0320437 A1 | 12/2012 | Kanaya |

OTHER PUBLICATIONS

United States Office Action issued in U.S. Appl. No. 13/464,742 dated Sep. 19, 2013.
United States Office Action issued in U.S. Appl. No. 13/434,114 dated Sep. 5, 2013.
United States Office Action issued in U.S. Appl. No. 13/075,720 dated Apr. 2, 2013.
United States Office Action issued in U.S. Appl. No. 13/075,720 dated Oct. 15, 2013.
United States Office Action issued in U.S. Appl. No. 13/111,498 dated Aug. 21, 2013.
United States Office Action issued in U.S. Appl. No. 13/369,035 dated Jul. 26, 2013.
Office Action dated Jun. 4, 2014 of Chinese Patent Application No. 201210194529.2 with English translation.

* cited by examiner

IMAGE READING WITH COLOR SHIFT CORRECTION

CROSS-REFERENCE TO RELATED APPLICATION

This application is based upon and claims the benefit of priority from Japanese Patent Application No. 2011-133678, filed Jun. 15, 2011, the entire contents of which are incorporated herein by reference.

BACKGROUND OF THE INVENTION

1. Field of the Invention

The present invention relates to an image-reading apparatus, an image processing method, and a computer program product.

2. Description of the Related Art

Some of conventional image-reading apparatuses correct color shifts of images.

For example, JP-B-6-18424 discloses an image-reading apparatus and a technique that corrects a color shift of an image by controlling driving of a motor that feeds documents. In the image-reading apparatus, another technique is disclosed that corrects the color shift by correcting an offset of a filter of a light receiving element such as a line sensor.

The conventional image-reading apparatus such as the apparatus disclosed in JP-B-6-18424, however, has a problem in that the color shift changes in a single document when the angle and the distance between a reading sensor and the document change while the reading sensor is in operation to read the document, so that color images are not truly reproduced.

SUMMARY OF THE INVENTION

It is an object of the present invention to at least partially solve the problems in the conventional technology.

An image-reading apparatus according to one aspect of the present invention includes a variation acquiring unit that acquires a variation of a distance or an angle between a medium to be read and an imaging unit or a light source, and a color shift correcting unit that calculates a color shift between the medium and the imaging unit or the light source based on the variation acquired by the variation acquiring unit and corrects the color shift.

An image processing method according to another aspect of the present invention executed by an image-reading apparatus includes a variation acquiring step of acquiring a variation of a distance or an angle between a medium to be read and an imaging unit or a light source, and a color shift correcting step of calculating a color shift between the medium and the imaging unit or the light source based on the variation acquired by the variation acquiring unit and corrects the color shift.

A computer program product having a non-transitory computer readable medium according to still another aspect of the present invention includes programmed instructions for an image processing method executed by an image-reading apparatus, wherein the instructions, when executed by the image-reading apparatus, cause the image-reading apparatus to execute a variation acquiring step of acquiring a variation of a distance or an angle between a medium to be read and an imaging unit or a light source, and a color shift correcting step of calculating a color shift between the medium and the imaging unit or the light source based on the variation acquired by the variation acquiring unit and corrects the color shift.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Embodiments of an image-reading apparatus, an image processing method, and a computer program product according to the present invention will be explained in detail below based on the drawings. The embodiments do not limit the invention.

Structure of an Image-Reading Apparatus 1

Figure 1:
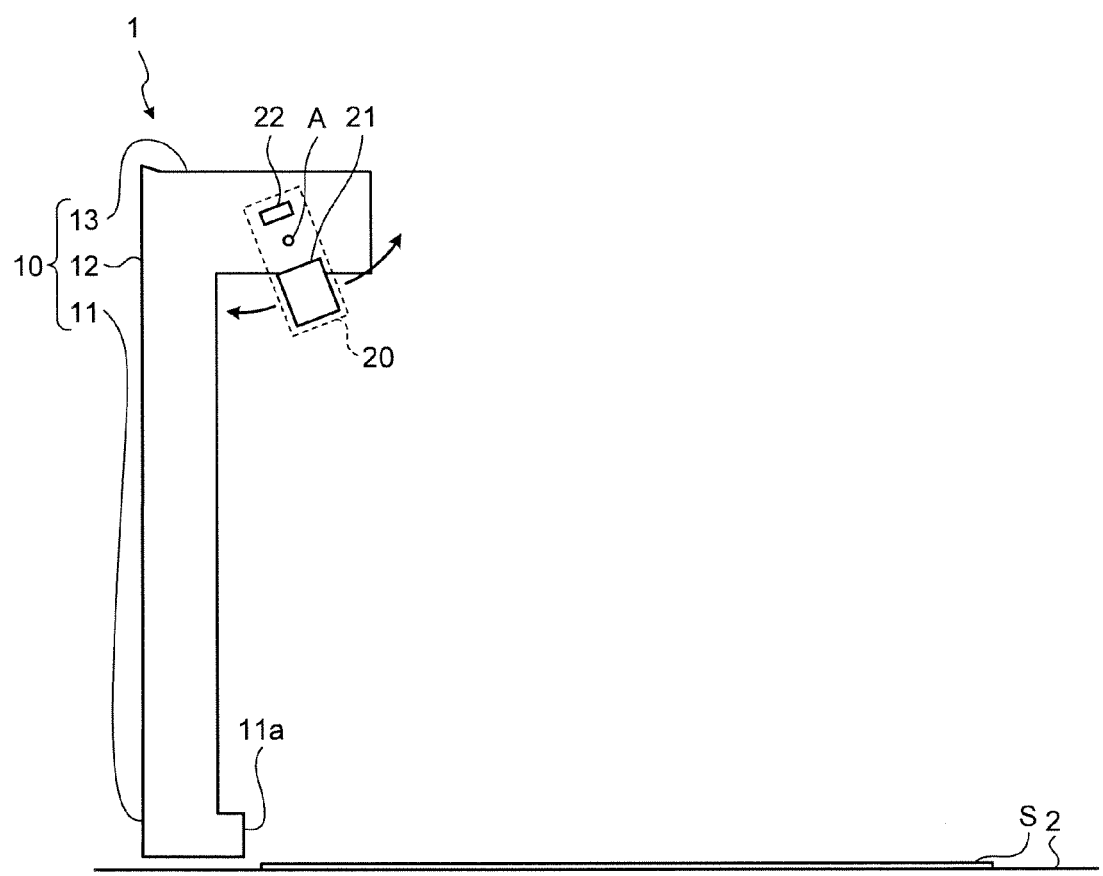
FIG. 1 is a diagram of an image-reading apparatus according to the embodiment.
Figure 2:
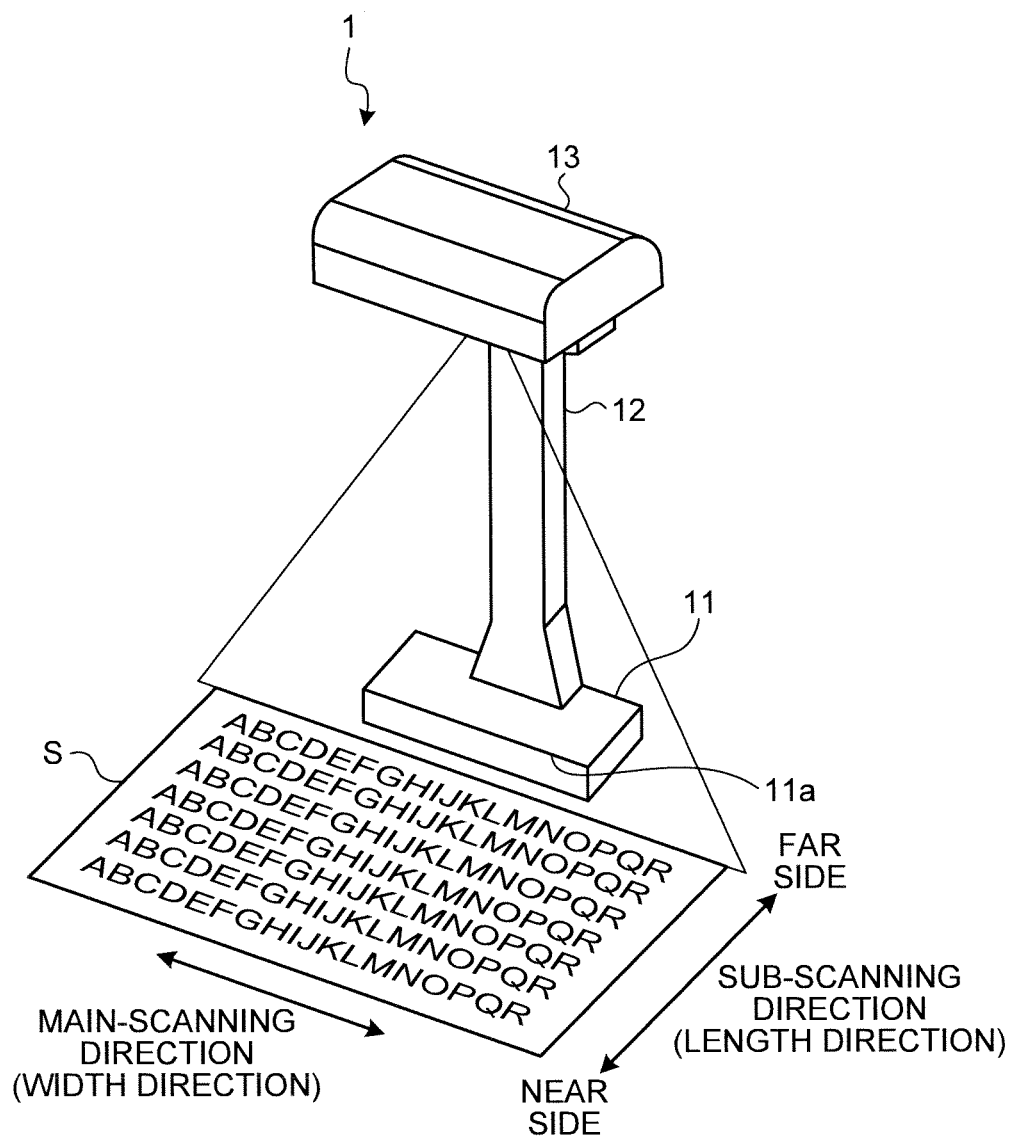
FIG. 2 is a perspective view of the image-reading apparatus according to the embodiment.
Figure 3:
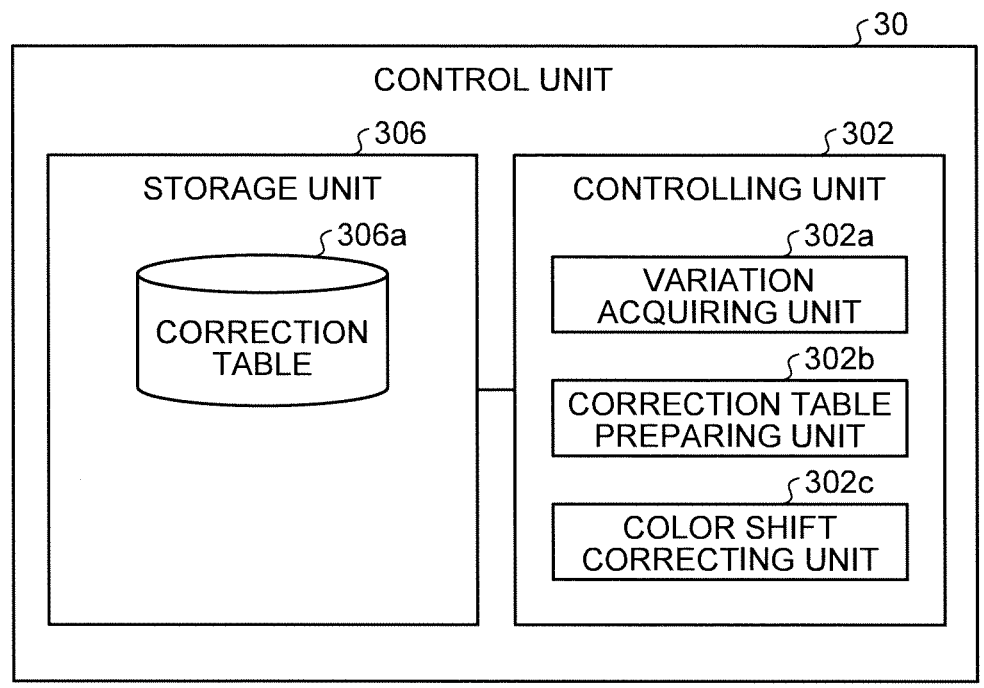
FIG. 3 is a block diagram of an example of a structure of a control unit in the embodiment.

A structure of the image-reading apparatus 1 is explained below with reference to FIGS. 1 to 3. FIG. 1 is a diagram of the image-reading apparatus 1 and depicts a cross section perpendicular to a rotation axis A of the image-reading apparatus 1 according to the embodiment. FIG. 2 is a perspective view of the image-reading apparatus 1 according to the embodiment. FIG. 3 is a block diagram of an example of a structure of a control unit 30 in the embodiment and conceptually depicts only a part relating to the invention in the structure.

The image-reading apparatus 1 shown in FIGS. 1 and 2 is an overhead scanner. The image-reading apparatus 1 includes a main body 10, an optical unit 20, and the control unit 30. The control unit 30 may be included inside the main body 10 or inside the optical unit 20, or may be provided at an outside of the image-reading apparatus 1. The image-reading apparatus 1 can read an image of the medium S to be read placed on a placement surface 2 located under the optical unit 20, i.e., a lower side in the vertical direction. The placement surface 2 is, for example, a flat surface such as a top surface of a desk.

In the embodiment, the image-reading apparatus 1 is placed on the same plane as the placement surface 2, as an example. The image-reading apparatus 1, however, is not limited to be placed in this manner. The place on which the image-reading apparatus 1 is placed may differ from the placement surface 2 on which the medium S to be read is placed. For example, the image-reading apparatus 1 may be provided with a placement table having the placement surface 2.

The main body 10 includes a pedestal 11, a supporter 12, and a cover 13. The pedestal 11 is placed on the placement surface 2, for example, and supports the whole of the main body 10 as a base of the main body 10. Operation members of the image-reading apparatus 1 such as a power source switch and an image-reading start switch are arranged on the pedestal 11, for example. The pedestal 11 has a flat shape, for example, and is placed such that a bottom surface thereof and the placement surface 2 are faced to each other. The pedestal 11 of the embodiment has a flat rectangular parallelepiped shape, or a similar or resembling shape thereof. The length in the vertical direction is smaller than both of the length in a width direction (a main-scanning direction, which is described later) and the length in a length direction (a sub-scanning direction, which is described later). The pedestal 11 may be shaped such that the length in the width direction is larger than the length in the length direction.

The medium S to be read is a reading target and is placed such that a side thereof abuts on a front surface 11a that is one of four side surfaces of the pedestal 11. That is, the medium S to be read is placed on the placement surface 2 such that the side thereof is parallel to the front surface 11a. In the embodiment, when the medium S to be read having a rectangular shape is placed such that a side thereof abuts on the front surface 11a, a direction parallel to the side abutting on the front surface 11a of the medium S is described as the "width direction". A direction parallel to a side perpendicular to the side abutting on the front surface 11a of the medium S to be read is described as the "length direction". That is, in the length direction, a user and the image-reading apparatus 1 are faced to each other when the user faces the image-reading apparatus 1 with the medium S to be read interposed therebetween. When the user faces the image-reading apparatus 1 with the medium S to be read interposed therebetween in the length direction, a side near the user is described as a "near side" while a side remote from the user is described as a "far side".

The supporter 12 is connected to the pedestal 11 and extends upward in the vertical direction from the pedestal 11. The supporter 12 is formed in a columnar shape or a chimney-like shape having a rectangular cross section, for example. The lower portion of the supporter 12 is formed in a tapered shape such that more increases a cross-section thereof the more downward in the vertical direction it extends. The supporter 12 is connected to a side of an upper surface of the pedestal 11. Specifically, the supporter 12 is connected to a side of the upper surface of the pedestal 11 and the side is opposite the side on which the placed medium S to be read abuts, out of four sides forming the edge of the upper surface. In other words, the supporter 12 is connected to an end, which is remote from the medium S to be read, i.e., on the far side, of the pedestal 11. The supporter 12 is connected to the pedestal 11 at a central portion of the pedestal 11 in the width direction.

The cover 13 supports the optical unit 20 rotatably, and can house the optical unit 20 inside thereof. The cover 13 covers the optical unit 20 from the upper side in the vertical direction. The cover 13 has a concave portion formed on an under surface thereof, for example, and can house the optical unit 20 inside the concave portion. The cover 13 is connected to an upper end of the supporter 12 in the vertical direction. The cover 13 protrudes from the supporter 12 on the near side in the length direction and on both sides in the width direction. Specifically, the cover 13 protrudes from the supporter 12 to a side on which the medium S to be read is placed and to both sides in the width direction.

In the image-reading apparatus 1, the pedestal 11 and the cover 13 are faced to each other in the vertical direction, and connected with the supporter 12 at both ends located on a side opposite the medium S side in the length direction. The cover 13 protrudes on the near side in the length direction beyond the pedestal 11. That is, at least a part of the cover 13 and the medium S to be read are faced to each other in the vertical direction when the medium S is placed on the placement surface 2 so as to abut on the pedestal 11.

The optical unit 20 can rotate around the rotation axis A with respect to the main body 10. The rotation axis A extends in the width direction. That is, the rotation axis A is parallel to the front surface 11a. The optical unit 20 is supported by the cover 13 rotatably around the rotation axis A. A driving unit (not shown) is disposed in an inside of the cover 13. The driving unit rotates the optical unit 20 around the rotation axis A. The driving unit includes an electric motor, and a gear unit that connects a rotation axis of the motor and the optical unit 20, for example. The motor is a stepping motor, for example, and can control a rotational angle of the optical unit 20 with high accuracy. The gear unit, which includes a combination of plural gears, for example, reduces the rotation of the motor and transmits the reduced rotation to the optical unit 20.

The optical unit 20 includes a light source 21 and an imaging unit 22. The light source 21, which is a reading light source, includes a light emitting unit such as a light-emitting diode (LED) and can irradiate the medium S to be read with light from the upper side in the vertical direction. The light source 21 may be formed with a plurality of LEDs arranged in a straight line along the main-scanning direction, for example. The light source 21 irradiates an image on a reading target line of the medium S to be read, i.e., a read image, with light. The imaging unit 22 is a reading sensor such as a line sensor. For example, the imaging unit 22 is an image sensor including a charge coupled device (CCD) on which an RGB filter is mounted and can image the medium S to be read that is placed on the placement surface 2. Specifically, the imaging unit 22 converts light that is reflected by a read image on the reading target line and incident on the imaging unit 22 into electronic data by photoelectric conversion and produces image data of the read image.

The light source 21 is disposed outside the imaging unit 22 in a radial direction perpendicular to the rotation axis A. A direction of an optical axis of the light source 21 is perpendicular to the rotation axis A. The optical axis of the imaging unit 22 and the optical axis of the light source 21 coincide with each other when viewed in an axial direction of the rotation axis A. That is, light in a direction perpendicular to the rotation axis A when viewed in the axial direction of the rotation axis A is incident on the imaging unit 22 and the incident light is imaged by a lens on a light receiving surface of the imaging unit 22.

The imaging unit 22 is a line sensor including a plurality of pixels that read an image and are arranged in the main-scanning direction. The imaging unit 22 is disposed in the optical unit 20 such that the main-scanning direction is parallel to the rotation axis A. Each pixel receives light of the read image imaged by the lens on the light receiving surface and outputs an electrical signal corresponding to the received light. The imaging unit 22 can read an image on the reading target line of the medium S to be read and produce line image data in the main-scanning direction. The imaging unit 22 may be a single-line sensor or a multiple-line sensor.

The image-reading apparatus 1 can acquire an image on the reading target line at any position in the sub-scanning direction on the medium S to be read by adjusting a rotational position of the optical unit 20 around the rotation axis A. The image-reading apparatus 1 can acquire image data of the whole of the medium S to be read by repeating the acquisition of the line image data and positional adjustment of the reading target line by rotating the optical unit 20. That is, in the image-reading apparatus 1, the document surface is scanned with irradiation light of the light source 21 in the sub-scanning direction and the imaging unit 22 reads an image of the reading target line irradiated with light, resulting in the image of the medium S to be read being produced. For example, the image-reading apparatus 1 produces two-dimensional image data of the medium S to be read by reading a line image of each reading target line while the position of the reading target line is sequentially shifted from the far side to the near side in the length direction.

In the optical unit 20 of the image-reading apparatus 1 of the embodiment, the optical axis of the light source 21 and the optical axis of the imaging unit 22 are along the same axis in directional vision of the rotation axis A. The light source 21 and the imaging unit 22 are fixed at the respective positions in the optical unit 20 and rotated around the rotation axis A with the rotation of the optical unit 20 without changing a mutual positional relationship. Unlike in the case that the light source 21 and the imaging unit 22 are independently driven and controlled from each other and that the light source 21 and a reflective member guiding light to the imaging unit 22 are independently driven and controlled from each other, the difference is suppressed from being produced between irradiation light of the light source 21 and the imaging target position of the imaging unit 22. Therefore, the light source 21 can irradiate the reading target line serving as the imaging target of the imaging unit 22 with high positional accuracy. As an example, the center of the reading target line in the sub-scanning direction can coincide with the center of the irradiation width of light emitted from the light source 21 regardless of the rotational position of the optical unit 20. As a result, the image-reading apparatus 1 of the embodiment suppresses the occurrence of light amount unevenness and the like, and improves quality of produced images.

In addition, because the difference is suppressed from being produced between irradiation light of the light source 21 and the imaging target position of the imaging unit 22, the irradiation width in the sub-scanning direction of the light source 21 can be reduced and light amount can be intensively supplied on the reading target line. As a result, the image-reading apparatus 1 of the embodiment can read the medium S to be read with high resolution, and high speed.

The control unit 30 generally includes a controlling unit 302, and a storage unit 306. The controlling unit 302 is a Central Processing Unit (CPU) or the like that performs overall control on the whole image-reading apparatus 1. The storage unit 306 is a device for storing various databases, tables, or the like. Each unit of the image-reading apparatus 1 is communicably connected to one another via any communication channels. The optical unit 20 may connect to the controlling unit 302 and the like via an input-output control interface unit. Furthermore, the image-reading apparatus 1 may be communicably connected to a network via a communication device, such as a router, and a wired communication line or a wireless communication means such as a dedicated line.

The storage unit 306 is a storage unit that is a fixed disk device such as Hard Disk Drive (HDD), Solid State Drive (SSD) and the like, and stores various databases and tables (a correction table 306a). For example, the storage unit 306 stores therein various programs, tables, files, databases, web pages, and the like used in various processing. The storage unit 306 may store produced image data. The storage unit 306 may store specification information of the image-reading apparatus 1, such as a distance between the rotation axis A and an image plane (e.g., a sensor surface) of the imaging unit 22, and the distance L' between the imaging unit 22 and the light source 21.

The correction table 306a included in the storage unit 306 is a correction value storage unit that stores a variation of the distance or the angle between the medium S to be read and the imaging unit 22 or the light source 21 and a correction value for the variation so as to correspond to each other. The correction table 306a may be prepared by the controlling unit 302.

the controlling unit 302 includes an internal memory for storing a control program such as an Operating System (OS), programs that define various processing procedures, and necessary data. The controlling unit 302 performs information processing for executing various processing by these programs or the like. The controlling unit 302 functionally and conceptually includes a variation acquiring unit 302a, a correction table preparing unit 302b, and a color shift correcting unit 302c.

The variation acquiring unit 302a is a variation acquiring unit that acquires a variation of a distance or an angle between a medium S to be read and the imaging unit 22 or the light source 21. The variation acquiring unit 302a may calculate a height h of the rotational center. The height h is the distance between the rotation axis A and the placement surface 2 or the medium S to be read. The variation acquiring unit 302a may calculate an object-image distance L that is a variation of the distance between the imaging unit 22 and the medium S to be read. The variation acquiring unit 302a may calculate a magnification $\beta$ that is an enlargement factor of an RGB image size changing with the change of the object-image distance L. The variation acquiring unit 302a may calculate a rotational angle $\theta$ of the rotation axis A when the medium S to be read is read based on a reading range Y of the medium S. The rotational angle $\theta$ is a variation of the angle of the imaging unit 22 or the light source 21. The variation acquiring unit 302a may calculate an angular speed $\omega$ of the rotation axis A when the medium S to be read is read. The variation acquiring unit 302a may calculate each variation of the distance between R and G and the distance between G and B, i.e., an offset e that is a color shift.

The correction table preparing unit 302b is a correction table preparing unit that prepares a correction table storing variations and correction values so as to correspond to each other. The correction table preparing unit 302b may calculate the change of the offset e caused by the change of the object-image distance L. The correction table preparing unit 302b may calculate the change of the offset e caused by reading the surface (document surface) of the medium S to be read from an oblique upper direction. The correction table preparing unit 302b may calculate the change of a shift quantity of RGB caused by the change of an image-reading speed. The correction table preparing unit 302b may calculate the correction value based on the change of the offset e caused by the change of the object-image distance L, the change of the offset e caused by reading the document surface from the oblique upper direction, and the change of the RGB shift quantity caused by the change of the image-reading speed. The correction table preparing unit 302b may calculate the correction value by merging the change of the offset e caused by the change of the object-image distance L, the change of the offset e caused by reading the document surface from the oblique upper direction, and the change of the RGB shift quantity caused by the change of the image-reading speed.

The color shift correcting unit 302c is a color shift correcting unit that calculates a color shift between the medium S to be read and the imaging unit 22 or the light source 21 based on the variation acquired by the variation acquiring unit 302a and corrects the color shift. The color shift correcting unit 302c may correct the color shift by using the correction table 306a that stores the variation and a correction value so as to correspond to each other.

Processing Executed by the Image-Reading Apparatus 1

An example of the processing executed by the image-reading apparatus 1 of the embodiment is explained below with reference to FIGS. 4 to 8.

Outline of the Embodiment of the Present Invention

Figure 4:
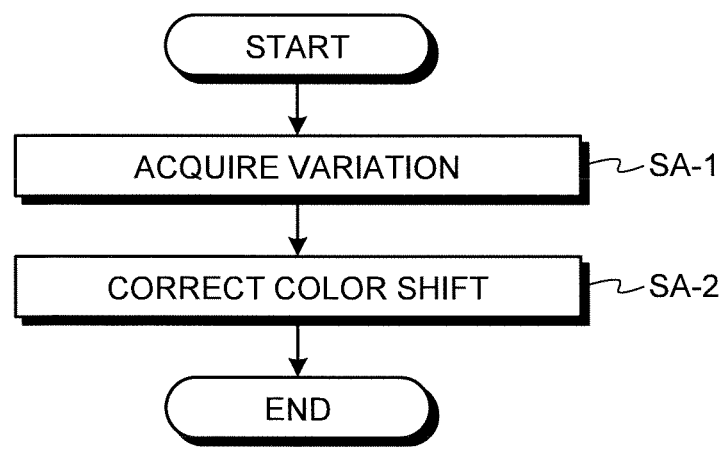
FIG. 4 is a flowchart of an example of a processing executed by the image-reading apparatus in the embodiment.

The outline of an embodiment of the present invention is explained below with reference to FIG. 4. FIG. 4 is a flowchart of an example of the processing executed by the image-reading apparatus 1 in the embodiment.

The embodiment has following basic features in general. That is, as shown in FIG. 4, the variation acquiring unit 302a acquires a variation of a distance or an angle between a medium S to be read and the imaging unit 22 or the light source 21 (step SA-1).

The color shift correcting unit 302c calculates a color shift between the medium S to be read and the imaging unit 22 or the light source 21 based on the variation acquired by the variation acquiring unit 302a at step SA-1 and corrects the color shift (step SA-2) and ends the processing. The color shift correcting unit 302c may correct the color shift by using the correction table 306a that stores the variation and a correction value so as to correspond to each other.

Color Shift Correction Processing

Figure 5:
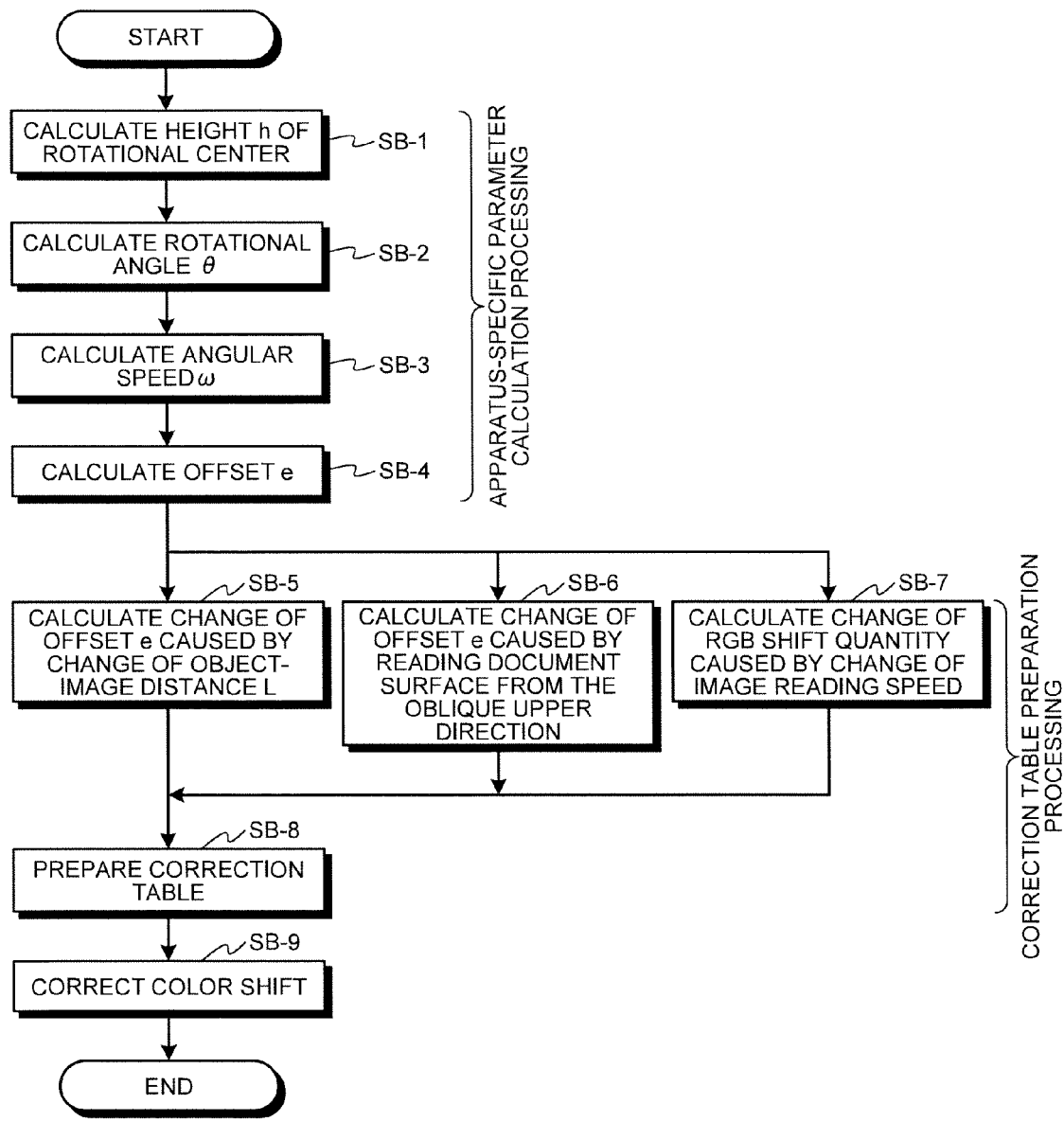
FIG. 5 is a flowchart of an example of a processing executed by the image-reading apparatus in the embodiment.
Figure 6:
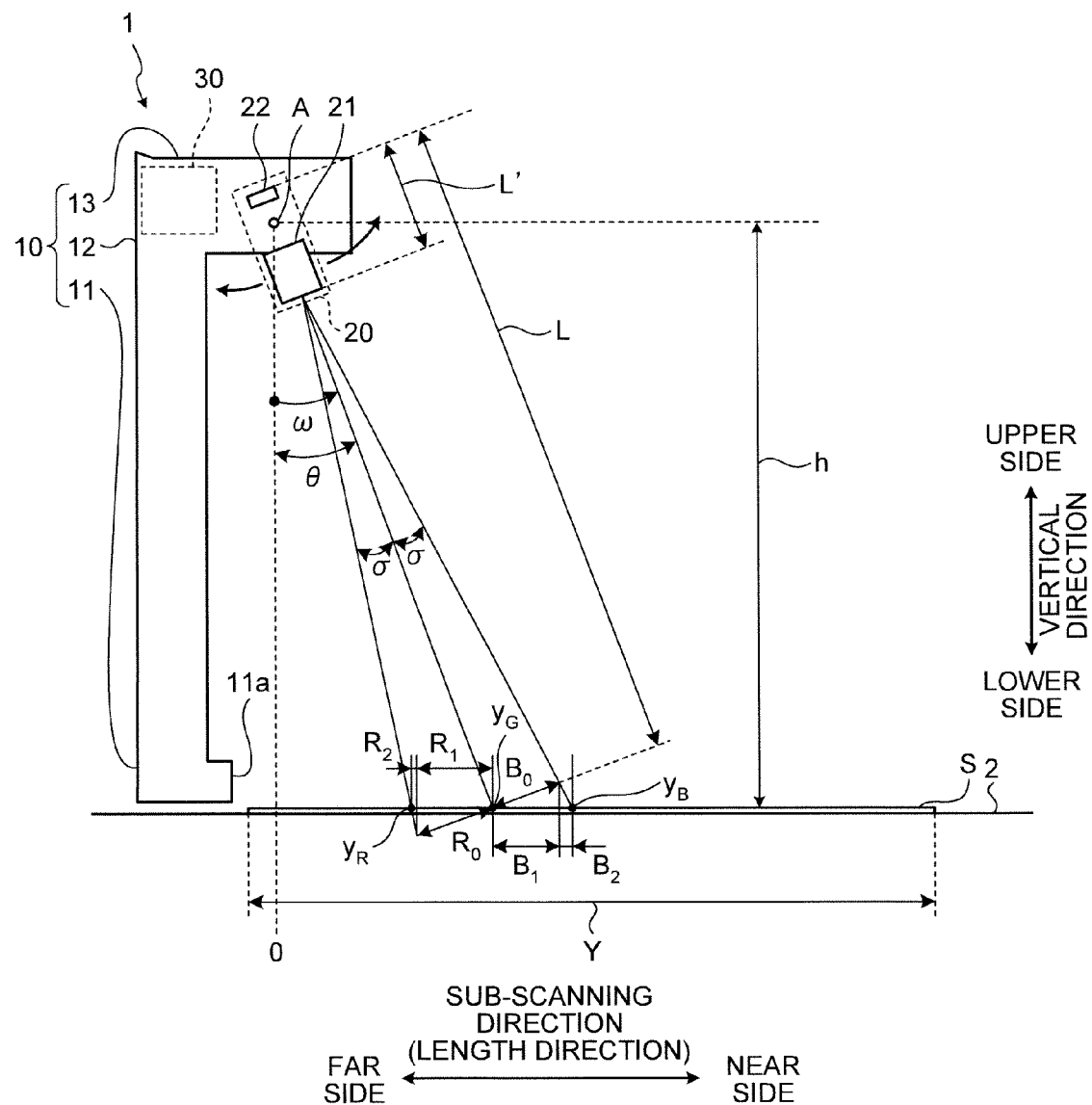
FIG. 6 is an example of a variation in the embodiment.

An example of the color shift correction processing of the embodiment is explained below with reference to FIGS. 5 to 8. FIG. 5 is a flowchart of an example of a processing executed by the image-reading apparatus 1 in the embodiment. FIG. 6 is an example of a variation in the embodiment.

As illustrated in FIGS. 5 and 6, the variation acquiring unit 302a calculates the height h of the rotational center, which is the distance between the rotation axis A and the medium S to be read, (step SB-1).

The variation acquiring unit 302a calculates the reading rotational angle θ, which is the variation of the angle made between the medium S and the imaging unit 22 or the light source 21, of the rotation axis A when the medium S to be read is read based on the reading range Y that is the reading range in the sub-scanning direction on the medium S to be read, the object-image distance L, which is the variation of the distance between the imaging unit 22 and the medium S, and the magnification β, which is the enlargement factor of the RGB image size changing with the change of the object-image distance L (step SB-2).

The variation acquiring unit 302a calculates the angular speed ω of the rotation axis A when the medium S to be read is read (step SB-3).

The variation acquiring unit 302a calculates each variation of the distance between R and G and the distance between G and B, i.e., the offset e that is the color shift (step SB-4).

Figure 7:
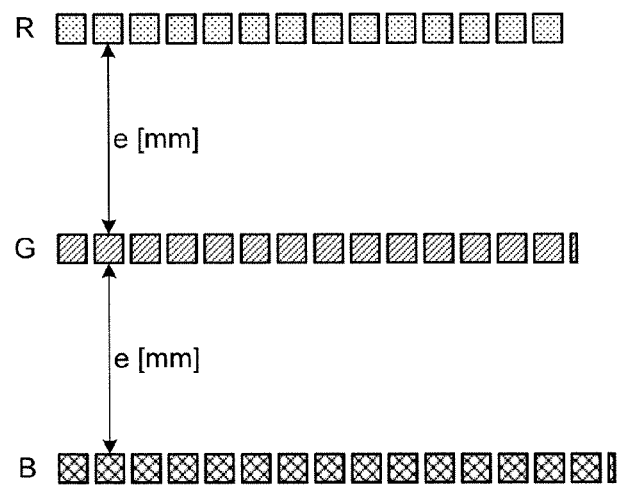
FIG. 7 is a diagram of an example of the offset in the embodiment.

An example of the offset e in the embodiment is explained with reference to FIGS. 6 and 7. FIG. 7 is a diagram of an example of the offset e in the embodiment.

As illustrated in FIG. 7, the variation acquiring unit 302a calculates each offset e (mm) between R and G and that between G and B with the same value when the reading rotational angle of the rotation axis A is θ as illustrated in FIG. 6.

The relationship between a reading position on the medium S to be read and the variation acquired by the variation acquiring unit 302a in the embodiment is explained with reference to FIG. 6.

As illustrated in FIG. 6, reading positions of RGB, i.e., $y_R$, $y_G$, and $y_B$, on the medium S to be read (e.g., a sheet) that are converted (e.g., focused) on a sensor surface at certain time t differ from each other when the CCD on which the RGB filter is mounted is used in the imaging unit 22 because the CCD reads RGB from different reading target lines with offsets interposed therebetween. That is, as illustrated in FIG. 6, when the reading position $y_G=y$, the reading positions $y_R$ and $y_B$ can be expressed as follows: $y_R=y-(R_1+R_2)$ and $y_B=y+(B_1+B_2)$. When angles of view of RG and GB are equal to σ radians as illustrated in FIG. 6, it can be expressed that $R_1=R_0 \cos\theta$, $R_2=R_0 \sin\theta \tan(\theta-\sigma)$, $B_1=B_0 \cos\theta$, and $B_2=B_0 \sin\theta \tan(\theta+\sigma)$. With the magnification β calculated by the variation acquiring unit 302a, it can be expressed that $R_0=B_0=e/\beta$. When the distance between the imaging unit 22 and the light source 21 is L' as illustrated in FIG. 6, it can be expressed that $\tan(\sigma)=e/\beta/(L-L')$ and $\sigma=a\tan[e/\beta/(L-L')]$. As a result, when the reading position $y_G=y$, it can be expressed that the reading position $y_R=y-(e/\beta)[\cos\theta+\sin\theta \tan(\theta+\sigma)]$ and the reading position $y_B=y+(e/\beta)[\cos\theta+\sin\theta \tan(\theta+\sigma)]$.

Referring back to FIG. 5, the correction table preparing unit 302b calculates the change of the offset e caused by the change of the object-image distance L (step SB-5).

The correction table preparing unit 302b calculates the change of the offset e caused by reading the document surface of the medium S to be read from the oblique upper direction (step SB-6).

The correction table preparing unit 302b calculates the change of the RGB shift quantity caused by the change of the image reading speed of the imaging unit 22 based on the angular speed ω calculated by the variation acquiring unit 302a at step SB-3 (step SB-7). The processing from step SB-5 to step SB-7 may be executed simultaneously or in any order by the correction table preparing unit 302b.

The correction table preparing unit 302b calculates the correction value by merging the change of the offset e caused by the change of the object-image distance L, the change of the offset e caused by reading the document surface from the oblique upper direction, and the change of the RGB shift quantity caused by the change of the image-reading speed. The correction table preparing unit 302b prepares a correction table that stores the variation acquired by the variation acquiring unit 302a and the correction value so as to correspond to each other (step SB-8).

The color shift correcting unit 302c corrects a color shift of a read image for each image-reading executed by the imaging unit 22 and for each line in the reading range Y by using the correction table 306a storing the variations and the correction values so as to correspond to each other (step SB-9), and then ends the processing. That is, the color shift correcting unit 302c combines the RGB lines by image processing executed in the image-reading apparatus 1 with reference to the change of the distance and the angle between the medium S to be read and the imaging unit 22 or the light source 21. The color shift correcting unit 302c may calculate the color shifts of RGB lines between the medium S to be read and the imaging unit 22 or the light source 21 and combine the RGB lines by the image processing.

Figure 8:
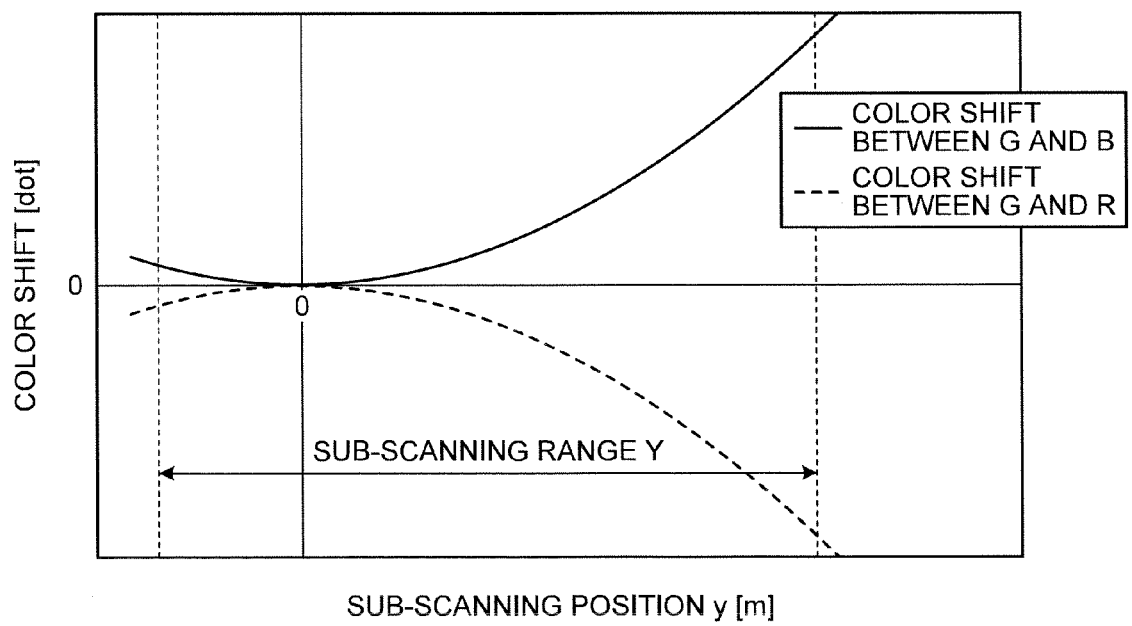
FIG. 8 is a diagram of an example of the color shifts caused by the RGB offset under the control that documents are scanned at a constant speed in the embodiment.

An example of the color shift caused by the RGB offset under the control that documents are scanned at a constant speed in the embodiment is explained with reference to FIG. 8. FIG. 8 is a diagram of an example of the color shifts caused by the RGB offset under the control that documents are scanned at a constant speed in the embodiment.

As illustrated in FIG. 8, the color shift between G and B and the color shift between G and R symmetrically change with the sub-scanning position y on the medium S to be read, i.e., within the sub-scanning range Y, and increase as the distance from the sub-scanning position y=0, which is direct under the imaging unit 22, on the medium S in the horizontal direction.

Example 1

Figure 9:
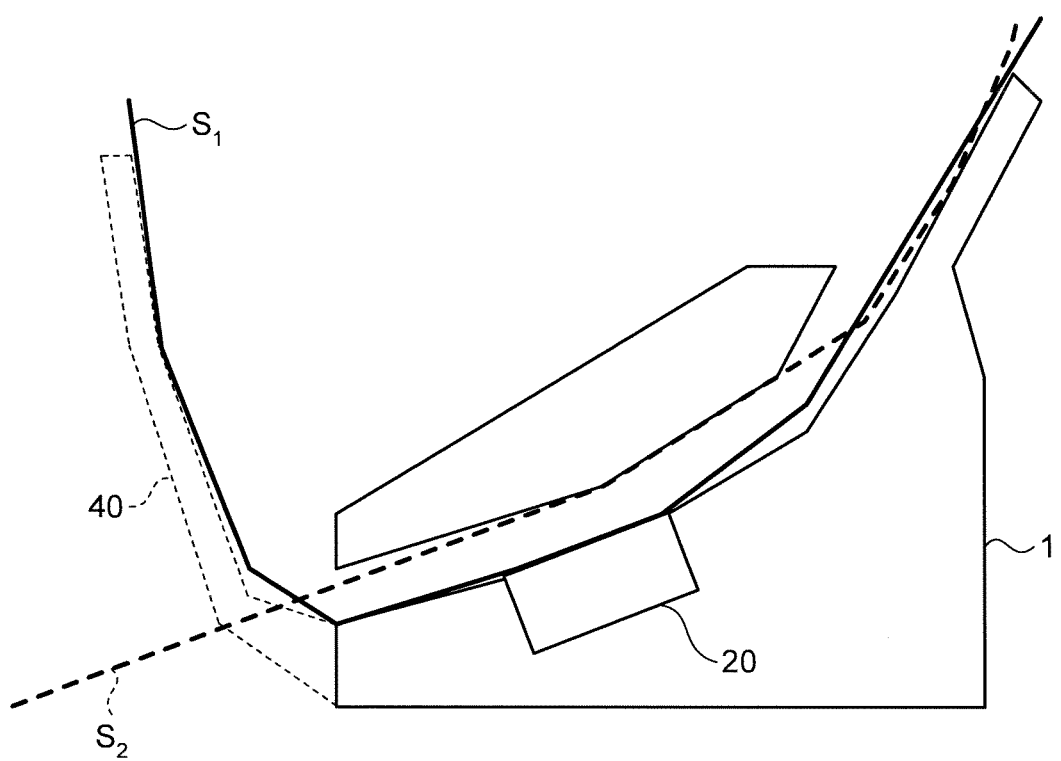
FIG. 9 is a diagram of an example of the image-reading apparatus provided with an auto document feed (ADF) mechanism in the example.

An example of the image-reading apparatus 1 according to the invention is explained with reference to FIGS. 9 to 11. FIG. 9 is a diagram of an example of the image-reading apparatus 1 provided with an auto document feed (ADF) mechanism in the example.

As illustrated in FIG. 9, the image-reading apparatus 1 provided with the ADF mechanism of the example has a mechanism in which the medium S (document) to be read is fed on different feed paths depending on whether a discharge tray 40 is attached, i.e., a mechanism that switches paper discharge (discharge) directions. Because of the mechanism, the positional relationship (distance and angle) between the optical unit 20 and the document S may change in the image-reading apparatus 1 provided with the ADF mechanism of the example.

An example of the positional relationship between the optical unit 20 and the medium S to be read in the example is explained with reference to FIGS. 10 and 11. FIG. 10 is a diagram of an example of the positional relationship between the optical unit 20 and a medium $S_1$ to be read in the example. FIG. 11 is a diagram of an example of the positional relationship between the optical unit 20 and a medium $S_2$ to be read in the example.

Figure 10:
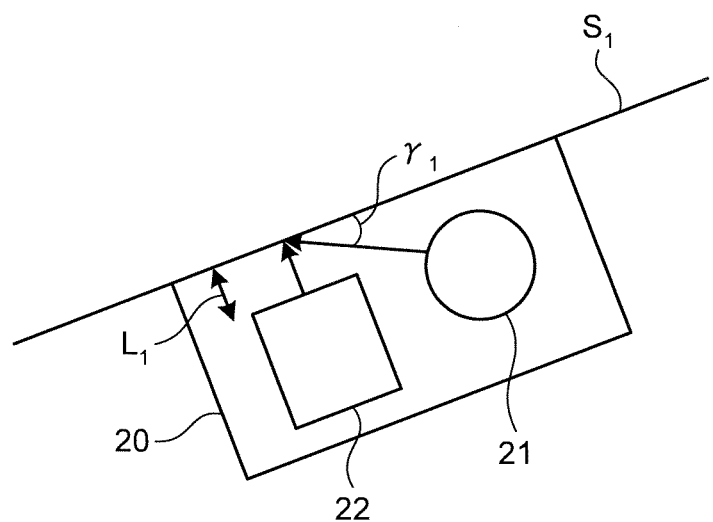
FIG. 10 is a diagram of an example of the positional relationship between the optical unit and a medium to be read in the example.

As illustrated in FIG. 10, when the discharge tray 40 is attached to the image-reading apparatus 1 provided with the ADF mechanism of the example, the medium $S_1$ to be read passes near the optical unit 20. As a result, an object-image distance $L_1$ is short while an angle $\gamma_1$ made between the medium $S_1$ to be read and an optical axis from the light source 21 to the medium $S_1$ is small. On the other hand, as illustrated in FIG. 11, when the discharge tray 40 is not attached to the image-reading apparatus 1 provided with the ADF mechanism of the example, the medium $S_2$ to be read passes through a position away from the optical unit 20. As a result, an object-image distance $L_2$ is long while an angle $\gamma_2$ made between the medium $S_2$ to be read and the optical axis from the light source 21 to the medium $S_2$ is large.

Figure 11:
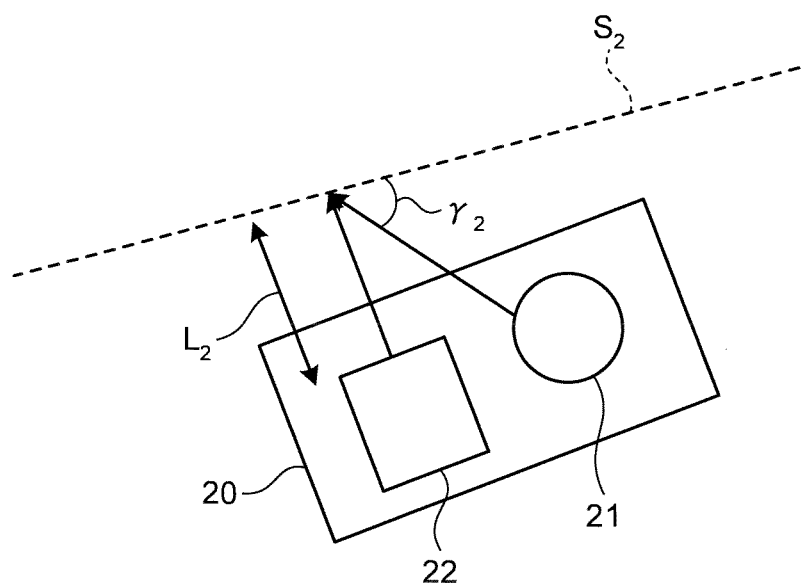
FIG. 11 is a diagram of an example of the positional relationship between the optical unit and a medium to be read in the example.

As illustrated in FIGS. 10 and 11, in the image-reading apparatus 1 provided with the ADF mechanism and to which the discharge tray 40 is attachable of the example, the positional relationship (distance and angle) between the optical unit 20 and the document S changes, thereby resulting in the change of the color shift. Therefore, in the example, the color shift correcting unit 302c detects the switching of the discharge directions of the medium S to be read and corrects the color shifts of read images by using the correction table 306a storing the variations that differ depending on the discharge directions and the correction values so as to correspond to each other.

Example 2

In the image-reading apparatus 1 provided with a flat bed (FB) mechanism of the example, the positional relationship (distance and angle) between the optical unit 20 and the document S may change. For example, in the image-reading apparatus 1 provided with the FB mechanism of the example, the positional relationship (distance and angle) between the optical unit 20 and the document S changes when the document S having a bound line such as a book is placed on a document table and a warped area near the bound line is read. Therefore, in the example, the color shift correcting unit 302c includes a correction mode for the warped area of the document S near the bound line and corrects the color shift near the bound line.

Other Embodiment

The embodiment of the present invention is explained above. However, the present invention may be implemented in various different embodiments other than the embodiment described above within a technical scope described in claims.

For example, an example in which the image-reading apparatus 1 performs the processing as a standalone apparatus is explained. However, the image-reading apparatus 1 can connect to an external device such as PC via network, and be configured to perform processes in response to request from the external device that includes software (computer program, data, or the like) to carry out the method of the present invention and return the process results including produced image data to the external device.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image-reading apparatus 1 are merely conceptual and may not necessarily physically resemble the structures shown in the drawings.

For example, the process functions performed by each device of the image-reading apparatus 1, especially the each process function performed by the controlling unit 302, can be entirely or partially realized by CPU and a computer program executed by the CPU or by a hardware using wired logic. The computer program, recorded on a non-transitory computer readable recording medium including programmed commands for causing a computer to execute the method of the present invention, can be mechanically read by the image-reading apparatus 1 as the situation demands. In other words, the storage unit 306 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the image-reading apparatus 1 via the network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases (the correction table 306a) stored in the storage unit 306 is a storage unit such as a memory device such as a RAM or a ROM, a fixed disk device such as a HDD, a flexible disk, and an optical disk, and stores therein various programs, tables, databases, and web page files used for providing various processing or web sites.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

According to the present invention, color images can be truly reproduced even when the angle and the distance between the reading sensor and a document change during reading of the document.

According to the present invention, the color shift correction processing can be executed at high speed.

According to the present invention, the succeeding color shift correction processing can be executed at high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead scanner comprising:
a light source configured to irradiate a medium to be read with light;
an imager configured to rotate together with the light source to scan the medium;
a controller configured to, when the imager scans the medium, obtain a variation of a distance or an angle between the medium and the imager or the light source, calculate a color shift between the medium and the imager or the light source based on the variation, and correct the color shift.

2. The overhead scanner according to claim 1, wherein the controller is configured to correct the color shift by using a correction table that stores the variation and a correction value associated with the variation.

3. The overhead scanner according to claim 2, wherein the controller is further configured to set the correction table.

4. An image processing method executed by an overhead scanner comprising a light source configured to irradiate a medium to be read with light; and an imager configured to rotate together with the light source to scan the medium, the image method comprising:
obtaining a variation of a distance or an angle between the medium and the imager or the light source;
calculating a color shift between the medium and the imager or the light source based on the variation; and
correcting the color shift.

5. A non-transitory tangible machine-readable medium having instructions for a controller of an overhead scanner comprising a light source configured to irradiate a medium to be read with light; and an imager configured to rotate together with the light source to scan the medium, the instructions, when the imager scans the medium, causing the controller to perform the steps of:
obtaining a variation of a distance or an angle between the medium and the imager or the light source;
calculating a color shift between the medium and the imager or the light source based on the variation; and
correcting the color shift.

\* \* \* \* \*